May 18, 1948.  G. E. CARPENTER  2,441,753
DUCK DECOY
Filed March 8, 1946
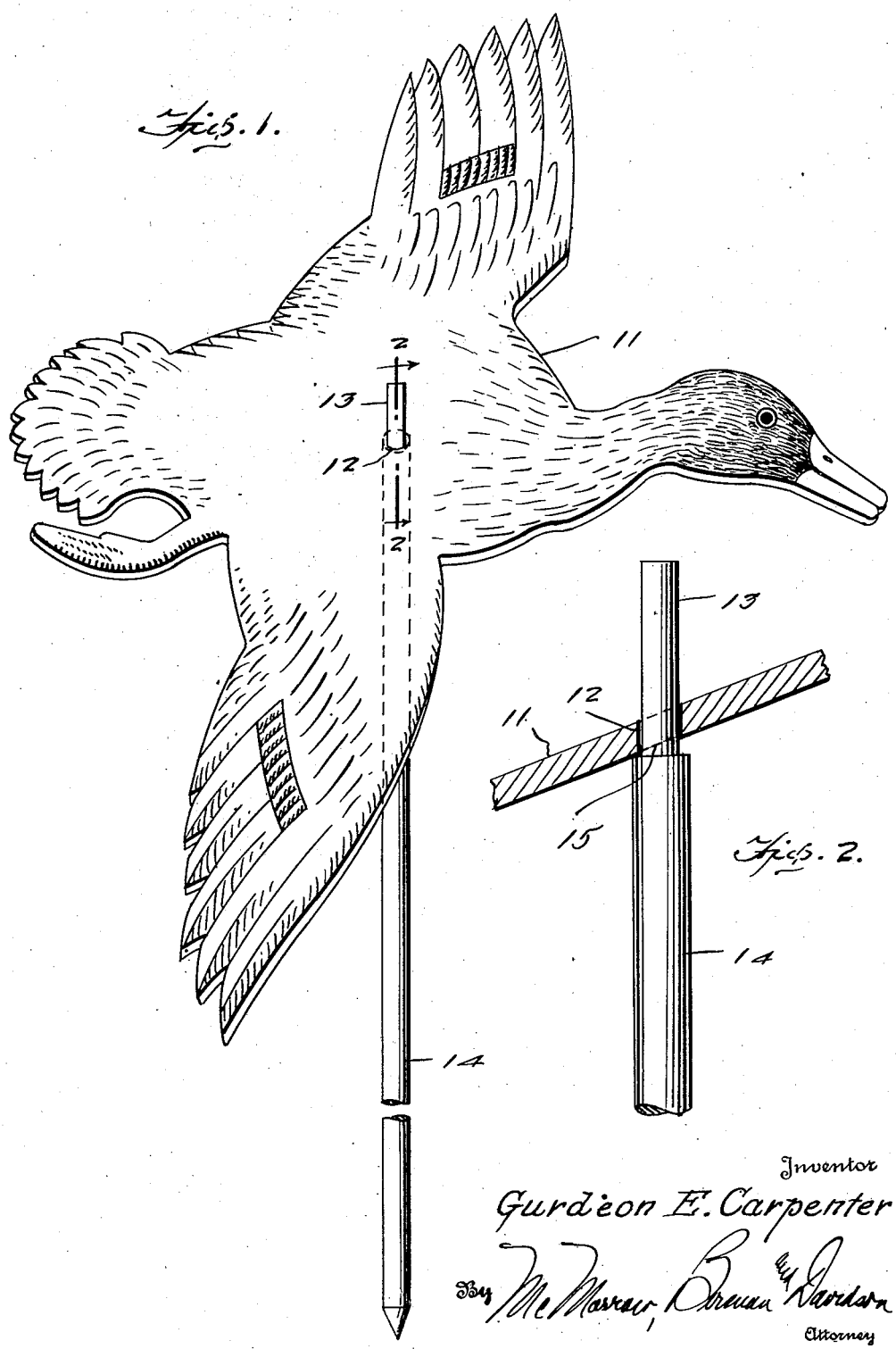
Inventor
Gurdeon E. Carpenter Patented May 18, 1948

2,441,753

UNITED STATES PATENT OFFICE 2,441,753

DUCK DECOY

Gurdeon E. Carpenter, Sauk Centre, Minn.

Application March 8, 1946, Serial No. 652,979

1 Claim. (Cl. 43—3)

This invention relates to duck decoys, and more particularly to a duck decoy which when viewed from above gives the appearance of a wild duck about to land.

A main object of the invention is to provide a novel and improved duck decoy of very simple construction which is very easy to use and which is very effective as a lure to flying ducks.

A further object of the invention is to provide an improved duck decoy simulating a duck about to land, said decoy being inexpensive to manufacture and being very compact so as to occupy a minimum of space during transportation or storage yet being able to be rapidly set up for use.

Further objects and advantages of the invention will become apparent from the following description and claims and from the accompanying drawing wherein:

Figure 1 is a perspective view of a duck decoy according to the present invention, set up for use.

Figure 2 is a detail cross-sectional view taken on line 2—2 of Figure 1.

Referring to the drawing, 11 designates the body portion of the decoy, said body portion being flat and shaped and painted to simulate the profile, as it would appear from above, of a lighting duck, cut out of suitable stiff, durable material such as plywood. Approximately at the center of gravity of body portion 11 an inclined opening 12 is bored, said opening being adapted to loosely fit the reduced upper portion 13 of a stake member 14 and to be loosely supported on an annular shoulder 15 formed between said reduced upper portion 13 and the main body of stake 14.

Stake 14 is of substantial height so that the decoy body portion 11 will be clearly visible from the air from any direction when the stake is mounted in marshy terrain, among reeds, rushes and the like.

Because hole 12 is bored at an incline through the flat body portion 11, the body portion is so balanced as to simulate the movement and action of a lighting duck with the slightest breeze and also heads into the wind, which is natural for a lighting duck. Due to its elevation the decoy will be always visible from any direction and can be effectively used in marshes, along lake shores and on high land. It is very light in weight and occupies a minimum of space for transportation and storage. It can be readily set up by merely inserting stake 14 into the ground and fitting hole 12 over the reduced top end 13 of the stake.

The decoy is painted to represent a male duck on one side and a female duck on the other side, and is readily reversible.

Although shown in the drawing as painted to represent a duck, the decoy may be painted and formed to represent other game birds such as geese, crows, pigeons, and the like, within the spirit of the present invention.

While a specific embodiment of a decoy device has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

In a decoy, a flat body simulating the appearance of wild game, said body having an inclined opening extending therethrough and arranged substantially centrally therein, and a vertically-disposed stake having an end extending through said opening and supporting said body thereon, said stake having a portion cut away adjacent said end to provide a shoulder for supporting said body to thereby afford the appearance of a duck flying downwardly and about to alight.

GURDEON E. CARPENTER.

REFERENCES CITED

The following references are of record in the file of this patent:

FOREIGN PATENTS

| Number | Country | Date |
|--------|---------|------|
| 1,550 | Great Britain | 1880 |
| 389,522 | Great Britain | May 20, 1933 |

OTHER REFERENCES

Popular Science Monthly (N. Y.) Sept., 1936, pages 59–62. (Copy on file in Division 2.)